United States Patent [19]

Lotze et al.

[11] Patent Number: 4,780,502

[45] Date of Patent: Oct. 25, 1988

[54] GOLD POLISH PREPARATION

[75] Inventors: Marion Lotze, Hammersbach; Dieter Frembs, Hanau, both of Fed. Rep. of Germany

[73] Assignee: Degussa Aktiengesellschaft, Frankfurt/Main, Fed. Rep. of Germany

[21] Appl. No.: 937,585

[22] Filed: Dec. 3, 1986

[30] Foreign Application Priority Data

Dec. 14, 1985 [DE] Fed. Rep. of Germany ....... 3544339

[51] Int. Cl.[4] ................................................ C08K 5/34
[52] U.S. Cl. .................................... 524/104; 106/1.13; 106/1.14; 106/14.14; 106/14.16; 106/3; 252/542
[58] Field of Search .............. 524/104; 106/1.13, 1.14, 106/14.14, 14.16, 3; 252/542

[56] References Cited

U.S. PATENT DOCUMENTS

| | | | |
|---|---|---|---|
| 2,886,547 | 12/1959 | Baggett et al. | 524/104 |
| 4,276,186 | 6/1981 | Bakos et al. | 252/158 |
| 4,433,091 | 2/1984 | Poulsen et al. | 524/386 |

OTHER PUBLICATIONS

*Merck Index;* Merck & Co., Inc., 1976, pp. 499, 1017, 1040.

Primary Examiner—Joseph L. Schofer
Assistant Examiner—Peter D. Mulcahy
Attorney, Agent, or Firm—Beveridge, DeGrandi & Weilacher

[57] ABSTRACT

A water compatible gold polish preparation is described containing gold compounds, organic carriers and flux materials wherein the organic carrier mixture is formed of 50 to 100% of 1 or more N-substituted -2-pyrrolidones and 0 to 50% of one or more water dilutable synthetic resins.

17 Claims, No Drawings

GOLD POLISH PREPARATION

The present invention relates to a gold polish preparation formulated to contain a gold compound soluble in organic solvents, optionally a gold powder and/or a gold compound insoluble in organic solvents, an organic carrier, a fluxing agent and color influencing additives.

Gold polishing preparations have been known for many years. Generally they contain finely divided gold powder which can be created, either partially or entirely, from thermally decomposable organic compounds, a fluxing agent and an organic carrier. In addition thereto, there can be components present in the preparation which influence the color of the gold film, such as for example salts and resinates of silver, paladium, platinum or rhodium.

The gold compounds of such prior known compositions and preparations are generally derivatives of cyclic terpenes and sulfur, such as for example sulfur resinates or mercaptides. In recent times there is more generally used Gold-(I) mercaptide, which because of its polymeric characteristic is itself insoluble in organic solvents, however through the substitution of particular substituent groups on the mercaptide can be converted to a soluble form. Representative soluble gold mercaptides which are soluble in organic solvents are shown for example in German DAS Nos. 12 84 807, 12 84 808, 12 86 866 and 12 98 828.

The flux material is generally a typical salt or resinate of bismuth, lead, boron, silicon, chromium, tin, copper and others, which determines the behavorial characteristics of the gold film during the burning operation, improves the adhesion of the gold film on the substrate and raises the resistance of the gold film to abrasion and corrosive chemicals.

The choice of the organic carrier is dependent upon the various methods of applying the coating of the gold polish preparation. Known organic carriers are for example methylethyl ketone, cyclohexanone, ethylacetate, xylol, petroleum ether, terpene, turpentine oil, asphalts, balsams, natural and synthetic resins, either individually or in mixtures. See DAS Nos. 12 84 807 and 12 84 808. However, these carriers can be, to a partial extent, hazardous to health and in addition are not water soluble or capable of being diluted with water.

It is known in the art to prepare a paint material for on glaze decoration which is formed from organic compounds and gold powder. See DOS No. 32 17 049. This paint material is dilutable with water and is not injurious to health. It contains polyvinylpyrrolidone or a mixture of polyvinylpyrrolidone and aqueous polyethylene oxide, dissolved in ethylene glycol and/or propyleneglycol and eventually water. In these organic carriers however, the known soluble gold mercaptides are not themselves soluble.

It is therefore an object of the present invention to provide a gold polish preparation which contains gold compounds which are soluble in organic solvents, optionally a gold powder and/or a gold compound which is not soluble in organic solvents, an organic carrier, a flux material and optionally a color influencing additive, in which the organic carrier is compatible with water and does not lead to hazardous conditions for health, and further, which also is capable of dissolving the known gold mercaptides.

The object of the present invention is achieved by utilizing as the organic carrier a mixture of 50–100% of one or more heterocyclic ketones represented by the structural formula:

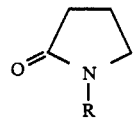

In which R is a straight or branched chain alkyl containing 1 to 6 carbon atoms, and 0 to 50% by weight of one or more synthetic resins which are dilutable with water and which are selected from the group consisting of amine, phenolic, acrylic, alkyd and epoxy resins.

Preferably the organic carrier is 1-methyl-2-pyrrolidone.

The organic carrier is formed of a solvent material and, optionally, an additional binder. Particularly well suited as solvent materials are the N-substituted 2-pyrrolidones. A substituent can be a straight or branch chained alkyl containing 1 to 6 carbon atoms. Advantageous as the solvent material is 1-methyl-2-pyrrolidone which is frequently used in the dye and polymer industry. Its solubility parameters lie within the range of a large number of polymers. It is miscible with water and most organic solvent materials. It has been found that it is also an outstanding material capable of dissolving gold-sec.-alkylmercaptides and goldsulforesinates. The solvent material represents 50 to 100 weight percent of the components of the carrier system. As solvent materials, the N-substituted 2-pyrrolidones are used when the gold polish preparation contains a minimum of 3, preferably 5 weight percent gold in the form of a soluble sulforesinate. The desireable solvent capabilities as well as the dispersability of solid material components operates to enable the streak free application of the gold polish preparations with a brush.

In combination with the 1-methyl-2-pyrrolidone there are a large amount of water dilutable polymers suitable as binders. The most important of these are polyvinylpyrrolidone, copolymers of vinylpyrrolidonevinylacetate; vinylpyrrolidone-styrene; polyvinylalcohol; polyvinylacetate; polyethyleneglycol, polypropyleneglycol; copolymers of ethyleneglycol-propyleneglycol; copolymers of ethylene-maleic acid. methylvinylether-maleic acid; styrene-maleic acid, and styrene-maleic acid monoesters. As binder materials, conventional synthetic resins are suitable which can be diluted with water either by themselves or after the addition of acids or bases. Therefore there may be utilized for these purposes the synthetic resins which are dilutable with water including amine, phenolic, alkyd, acrylic, and epoxy resins which dry in air according to an oxidative and/or cross linking principle.

Examples of amine resins are complete or partial methyl etherated melamine or urea formaldehyde condensation products, which are obtainable in solvent free, solvent containing or water dilutable form. With using mono or low molecular weight types, such as for example hexamethoxymethylmelamine, it is desireable to add an acid catalyst such as for example hydrochloric acid, phosphoric acid, p-toluolsulfonic acid or maleic acid in a concentration of from 1 to 8 weight percent, based on the solid material portion of the binder. The amine resins can be used as sole binder materials or in combination with complementary resins such as acrylic, alkyd and epoxy resins. For the control of the drying velocity, an acid catalyst can be also introduced into the system. Binder material mixtures are particularly advantageously composed of 10 to 20 weight percent amine resin and 80 to 90 weight percent of a complementary resin. As an example of an oxidatively drying, water dilutable resin there may be noted alkyl resins based on an unsaturated acid such as for example a fatty acid with an oil content of 20 to 70 weight percent, also epoxy esters based on unsaturated acids such as for example linseed oil-wood oil epoxy resins.

The binder material content of the carrier system ranges from 0 to 50 weight percent. The carrier system can also contain water up to a concentration of 20 weight percent and other water miscible solvent materials such as for example alcohols, glycols, glycol ethers, in a maximum concentration of up to about 40 weight percent. To vary the gold tone these preparations can also include silver, paladium or platinum compounds. Advantageously one may use Rhodium(III)-chloride.

The invention is further illustrated in the following examples where representative compositions of the inventive gold polish preparation are shown:

EXAMPLE 1

| Weight Percent | Component |
| --- | --- |
| 51.75 | Goldsulforesinate, dissolved in 1-methyl-2-pyrrolidone (7.7 weight percent gold) |
| 24.00 | Gold powder (particle size 0.5–1.0 μm) |
| 5.00 | Gold(III)sulfide (80 weight percent gold) |
| 4.00 | Silver powder (particle size 0.5–1.0 μm) |
| 0.50 | Bismuth subnitrate |
| 0.25 | Rhodium(III)chloride |
| 1.80 | Melamine-Formaldehyde resin 75 weight percent dissolved in water |
| 12.70 | Alkyd resin (oil content 45 weight percent; neutralized form) 65 weight percent in glycol ether |

The gold sulforesinate (50 percent by weight of gold) is first dissolved in 1-methyl-2-pyrrolidone and then mixed with the remaining components for 48 hours in a ball mill.

EXAMPLE 2

| Weight Percent | Component |
| --- | --- |
| 65.35 | Gold sulforesinate, dissolved in 1-methyl 2-pyrrolidone (15.3 weight percent gold) |
| 8.00 | Gold powder (0.5–1.0 μm) |
| 2.00 | Silver powder (0.5–1.0 μm) |
| 24.00 | Linseed oil-wood oil epoxy ester (acid number 40–50) 70 weight percent in glycol ether |
| 0.50 | Bismuth subnitrate |
| 0.15 | Rhodium(III)chloride |

EXAMPLE 3

| Weight Percent | Component |
| --- | --- |
| 92.35 | Gold sulforesinate, dissolved in 1-methyl 2-pyrrolidone (17.3 weight percent gold) |
| 5.00 | Gold powder (0.5–1.0 μm) |
| 2.00 | Silver powder (0.5–1.0 μm) |
| 0.50 | Bismuth subnitrate |
| 0.15 | Rhodium(III)chloride |

All three gold polish preparations were suitable for brush applications.

Further variations and modifications of the foregoing invention will be apparent to those skilled in the art and are intended to be encompassed by the claims appended hereto.

The German application No. P 35 44 339.1 relied on and incorporated herein by reference.

We claim:

1. A gold polish preparation comprising at least one gold containing compound which is a gold mercaptide compound which is soluble in an organic solvent, an organic carrier containing at least 50% by weight of at least one heterocyclic ketone represented by the structural formula: where an R is a straight or branch chained alkyl containing 1 to 6 carbon atoms.

2. The preparation of claim 1 which additionally contains finely divided gold powder.

3. The preparation according to claim 1 which additionally contains a gold compound insoluble in organic solvents.

4. The preparation according to claim 1 which additionally contains a flux material.

5. The preparation according to claim 1 which additionally contains a color influencing additive.

6. The preparation according to claim 1 in which the organic carrier additionally contains from 0 to 50% by weight of a binder material which is at least one synthetic resin dilutable with water.

7. The preparation according to claim 6 wherein the synthetic resin is selected from the group consisting of amine, phenolic, acrylic, alkyd and epoxy resins, and mixtures thereof.

8. The preparation according to claim 1 wherein the organic solvent is 1-methyl-2-pyrrolidone.

9. The preparation according to claim 7 wherein the resin is an amine resin.

10. The preparation according to claim 9 wherein the amine resin is a complete or partial methyletherated melamine or urea formaldehyde condensate.

11. The preparation according to claim 6 which contains 10 to 20 weight percent of amine resins and 80 to 90% of a complementary resin selected from the group consisting of acrylic, alkyd and epoxy resins.

12. The preparation according to claim 6 which additionally contains a catalyst to speed the drying time of the binder material.

13. The preparation according to claim 1 which additionally contains a member selected from the group of silver, paladium, or platinum compounds and mixtures thereof.

14. The preparation according to claim 1 wherein the gold compound is gold sulforesinate.

15. The preparation according to claim 1 which contains a mixture of gold powder and silver powder.

16. A two component gold polish preparation formed of a first component comprising a gold mercaptide compound in a solution of one or more heterocyclic ketones having the structural formula:

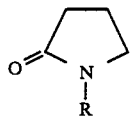

wherein R is a straight or branch chain alkyl group from 1 to 6 carbon atoms, and a second component which comprises an additional gold containing component insoluble in an organic solvent.

17. The composition according to claim 16 wherein the second component additionally contains from 0 to 50 weight percent of one or more synthetic resins dilutable in water selected from the group consisting of amine, phenolic, acrylic, alkyd and epoxy resins and mixtures thereof.

* * * * *